April 5, 1938.  R. J. CORDES  2,113,172
MANUFACTURE OF HEADED BLANKS
Filed April 29, 1936
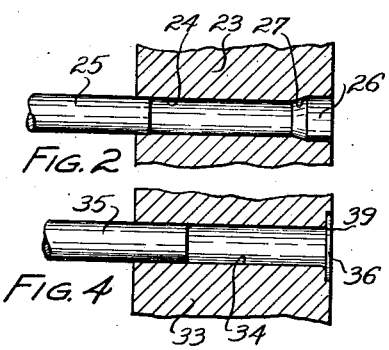
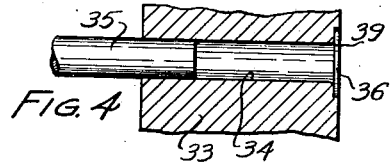
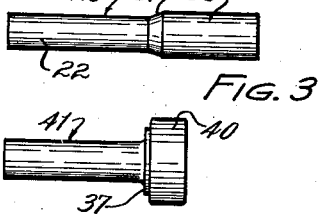
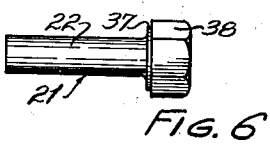
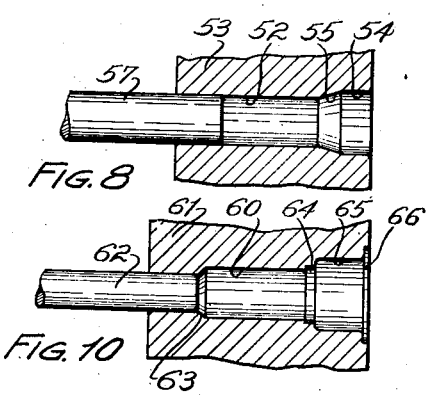
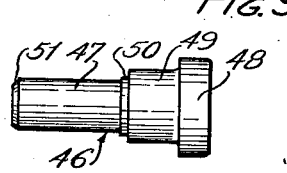
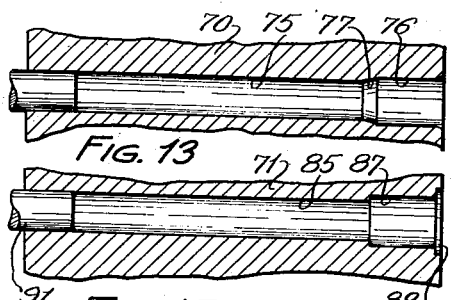
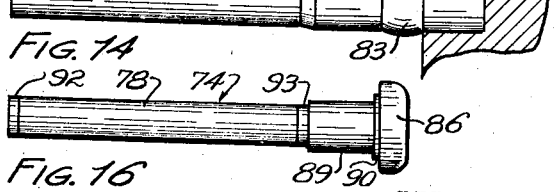
INVENTOR.
ROBERT J. CORDES
BY
Kwis, Hudson & Kent
ATTORNEYS.

Patented Apr. 5, 1938

2,113,172

UNITED STATES PATENT OFFICE 2,113,172

MANUFACTURE OF HEADED BLANKS

Robert J. Cordes, Cleveland, Ohio, assignor to The Lamson & Sessions Company, Cleveland, Ohio, a corporation of Ohio Application April 29, 1936, Serial No. 77,005

4 Claims. (Cl. 10—27)

This invention relates to the manufacture of headed blanks, such as blanks for making bolts or the like, and more particularly to a novel method and means for economically producing headed blanks of superior quality.

Those skilled in the art of making headed blanks for the manufacture of bolts and the like are aware that methods have been devised for the production of such blanks by the use of extruding operations. Such extruding operations reduce a portion of a length of stock to a stem or shank of a diameter suitable for the formation of threads thereon as by a rolling operation. The extruding leaves the length of stock with an unreduced portion which contains sufficient metal that when upset it forms a head of a size in proper proportion to the stem diameter.

My invention contemplates the provision of a novel method and means for the production of headed blanks, and the like, by a single extruding operation.

Another object of my invention is to provide a novel method of making headed blanks, or the like, wherein a portion of a length of stock is reduced by a single extruding operation to a stem of threading diameter which is connected with the unreduced portion by a shoulder, and then subjecting the unreduced portion to an upsetting operation in which the stress of the upsetting force is taken against such shoulder.

A further object of my invention is to provide a novel method of producing headed blanks, or the like, wherein a portion of a length of stock is reduced by a single extruding operation to thereby form a stem portion of threading diameter which is connected with the unreduced portion by a shoulder, and then inserting the stem portion into a die recess which is only a tolerance larger than the threading diameter and subjecting the unreduced portion to an upsetting operation in which the stress of the upsetting force is taken against said shoulder.

Another object of this invention is to provide a novel method for the production of headed blanks, or the like, wherein a portion of a length of stock is subjected to a single extruding operation to form a stem portion of threading diameter, and then upsetting the unreduced portion to form a head substantially without change in the diameter of the stem portion.

Yet another object of my invention is to provide a novel method for the production of headed blanks, or the like, wherein a portion of a length of stock is reduced to threading size by a single extruding operation, and wherein the reduced portion of the blank thus formed is pointed and the unreduced portion is upset in a single operation.

My invention also contemplates the provision of a headed blank of improved quality having a stem portion of threading diameter produced by a single extruding operation and an upset head portion and also having a shoulder section at the junction of the head and stem portions.

Other objects and advantages of the invention will be apparent from the following description when taken in conjunction with the accompanying sheet of drawings wherein, Fig. 1 is a side elevation of a length of round stock to be used in carrying out my invention.

Fig. 2 is a longitudinal sectional view taken through an extruding die used in carrying out my method.

Fig. 3 is a side elevation showing the partially formed blank as delivered from the extruding die of Fig. 2.

Fig. 4 is a longitudinal sectional view taken through an upsetting die used in carrying out my method.

Fig. 5 is a side elevation of the blank as delivered from the upsetting die of Fig. 4.

Fig. 6 is a side elevation showing the blank completed and ready for threading.

Fig. 7 is a side elevation showing another length of round stock to be used in producing another headed blank by my novel method.

Fig. 8 is a longitudinal sectional view of another extruding die.

Fig. 9 is a side elevation showing a partially formed blank as delivered from the extruding die of Fig. 8.

Fig. 10 is a longitudinal section taken through another upsetting die.

Fig. 11 is a side elevation showing the completed blank as delivered from the upsetting die of Fig. 10.

Fig. 12 is a side elevation showing another length of round stock for use in forming another headed blank by my method.

Fig. 13 is a longitudinal sectional view through another extruding die.

Fig. 14 is a side elevation showing the partially formed blank as delivered from the extruding die of Fig. 13.

Fig. 15 is a longitudinal sectional view taken through another upsetting die, and Fig. 16 is a side elevation showing a completed blank delivered from the upsetting die of Fig. 15 and ready for threading.

In the accompanying drawing to which more detailed reference will presently be made, I have illustrated by way of example the formation of three different types of headed blanks by my novel method and apparatus. It will be understood, of course, that the invention is not limited to the production of only the three specific forms of headed blanks shown in the drawing but may be adapted to the production of various other forms of headed blanks and articles.

In Fig. 1 of the drawing I have shown a length of round stock 20, which may be used in carrying out my novel method and which contains approximately the correct amount of metal for forming the headed blank 21 of Fig. 6. The length of stock may be obtained from any available source, such as by cutting from the end of a suitable bar or rod of stock of a diameter greater than the diameter of the stem portion 22 of the completed blank 21.

In Fig. 2 of the drawing I show an extruding die 23 by which a portion of the length of stock 20 is extruded and thereby reduced. This die is formed with a cylindrical recess 24 therein having a diameter equal to the diameter desired for the stem portion 22 of the finished blank. When the blank is to be threaded by rolling threads on the stem portion thereof, it is desirable to have the diameter of the die recess substantially equal to the pitch diameter of the thread to be formed on the stem portion. One end of the die recess 24 may be closed by a movable knock-out pin 25. The other end of the die recess communicates with a guide opening or shoulder 26, which receives and guides one end of the length of stock 20. The guide shoulder 26 and the die recess 24 are connected by an annular tapered section or throat 27 through which the extruding of the stock takes place.

The extruding operation is carried out by forcing one end of the stock 20 through the tapered throat 27 and into the die recess 24. This may be done in any suitable apparatus, such as a cold header wherein movement of the hammer towards the die 23 is used to force the stock 20 into the die recess.

After the extruding operation has been performed on the stock 20, as just explained, the knock-out pin 25 ejects the blank from the die recess 24. In Fig. 3 I show a blank 29 of the form ejected from the extruding die 23. This blank has a reduced or extruded stem portion 22 which is of proper diameter for the threading operation to be performed on the finished blank 21. The blank 29 also has an unreduced or head portion 30 which is connected with the reduced stem portion 29 by an annular tapered shoulder 31, corresponding in shape with the shape of the tapered throat 27 of the extruding die.

In Fig. 4 I show an upsetting die 33 to which the partially formed blank 29 is supplied. This die has a recess 34 which is open at its outer end and at its inner end is closed by one end of a knock-out pin 35. The die recess 34 is only a tolerance larger in diameter than the stem portion 22 of the finished blank, such that the stem portion of the blank 29 of Fig. 3 can be just freely inserted into the recess. The outer end of the recess 34 communicates with a shallow circular recess or countersink 36 of larger diameter. The depth and diameter of the countersink 36 corresponds, respectively, with the length and diameter of a shoulder section 37 to be formed on the finished blank at the junction of the stem portion 22 with the head portion 38. The outer end of the die recess 34 may be provided with an annular fillet 39 of small radius at the point of connection of the die recess with the countersink 36.

In the upsetting operation, which is carried out with the die 33 and a suitable hammer cooperating therewith, the stem portion 22 of the blank 29 is inserted into the die recess 34 and the unreduced portion 30 is subjected to an upsetting blow by the hammer. The blow of the hammer causes the unreduced portion 30 to be upset into a head such as the round head 40 of the blank 41. During this upsetting operation the tapered shoulder 31 of the blank 29 engages the portion of the die surrounding the outer end of the recess 34 and the stress or force of the upsetting blow of the hammer, or at least a substantial part thereof, is taken by the tapered shoulder 31. This causes the metal of the blank at and adjacent the tapered shoulder 31 to be pushed back as the stem portion moves on into the recess 34 and to be expanded into the countersink 36, thereby forming the shoulder section or washer face 37 on the blank 41. The stress or force of the upsetting operation may be taken in part by the inner end of the stem portion 22 engaging the knock-out pin 35.

When the stress or force of the upsetting operation is thus taken either by the tapered shoulder 31, or by this shoulder and the knock-out pin 35 together, I find that the upsetting operation can be carried out with a single blow of the hammer and substantially without change or upsetting of the stem portion 22. By thus upsetting the unreduced portion of the stock substantially without any upsetting of the previously extruded stem portion 22 I find that the blank 41 can be ejected from the die recess 34 with comparatively little work or effort being required of the knock-out pin 35 and without the destructive frictional or abrading action which would necessarily occur if the stem portion had been upset or expanded in the die recess. This is extremely important in the commercial production of headed blanks because it greatly increases the useful life of the upsetting die.

By a suitable trimming operation the round head 40 of the blank 41 may be given a desired polygonal shape such as that of the head 38 of completed blank 21.

In Fig. 7 of the drawing I have shown a length of round stock 45 providing approximately the correct amount of metal for forming a headed blank 46. This blank may, as shown in Fig. 11, have a stem or shank portion 47 upon which threads are to be formed by rolling and a round head portion 48. The stem and head portions may be connected by shoulder sections 49 and 50, the shoulder section 49 being provided for the forming of a knurled part on the finished bolt. The shoulder section 50 may be an annular section having a diameter substantially equal to the overall diameter of the threads which are to be rolled on the stem portion 47. This stem portion may have a diameter substantially equal to the pitch diameter of the threads to be formed thereon and may be pointed or chamfered at its free end as indicated at 51.

In forming the blank 46 by my method the stock 45 is forced into the recess 52 of the extruding die 53 through the guide opening 54 and the tapered throat 55. The extruding operation thus performed reduces a portion of the stock 45 so that the partially formed blank 56 which is ejected from the die 53 by the knock-out pin 57 has a reduced stem portion 47 of proper diameter for threading. This reduced stem portion is connected with the unreduced portion 58 of the blank by an annular tapered shoulder 59.

The stem portion 47 of the blank 56 is then inserted into the recess 60 of the upsetting die 61. The diameter of this recess is only a tolerance larger than the diameter of the stem portion 47 so as to just freely receive the latter. The inner end of the die recess 60 is closed by the end of a knock-out pin 62 and may be provided with a tapered annular pointing section 63. The outer end of the die recess is provided with a plurality of circular recesses or countersinks of different diameters and depths 64, 65 and 66. The countersink 64 forms the shoulder section 50 on the blank 46, and the countersink 65 forms the shoulder section 49. The countersink 66 cooperates with the hammer to form the head 48.

In carrying out the upsetting operation the hammer strikes a blow against the unreduced portion 58 of the blank 56 and upsets the same to form the head 48. The force of the upsetting blow is taken by the engagement of the tapered shoulder 59 in the countersink 64 and, in some cases, in part by engagement of the inner end of the stem portion 47 against the knock-out pin 62. In addition to upsetting the unreduced portion 58, the blow of the hammer causes the tapered shoulder 59 to be pushed back and expanded in the countersinks 64 to form the shoulder section 50 and also causes the inner end of the stem portion to conform to the shape of the pointing section 63 of the die recess. Since the force or stress of the upsetting operation is thus taken in pointing the inner end of the stem portion and in forming the shoulder sections 49 and 50, the stem portion itself is not upset and the blank 46 can be ejected from the die 61 without destructive frictional or abrading action thereon.

In Figs. 13 and 15 I have shown other extruding and upsetting dies 70 and 71 which may be used in carrying out the extruding and upsetting steps of my novel method. In Fig. 12 I show a length of stock 72 from which the partially formed and completed blanks 73 and 74 are formed.

In carrying out my method to produce the blank 74, the stock 72 is forced into the recess 75 of the extruding die through the cylindrical guide section 76 and the tapered throat section 77. In forcing the stock into the die a portion of the length of stock is extruded into the recess 75 and thereby reduced and formed into a stem portion 78 of proper diameter for threading. The stem portion 78 is connected with the unreduced portion 79 of the blank 73 by a tapered shoulder section 80. In this extruding operation the stock 72 is forced into the extruding die 70 by a suitable hammer 81 having a recess 82 in which one end of the stock is received. If the length of stock 72 is cut longer than necessary the excess material may cause more or less bulging between the hammer 81 and the outer end of the die 70 as has been indicated at 83.

The stem portion 78 of the blank 73 is inserted into the recess 85 of the upsetting die 71, this recess being only a tolerance larger in diameter than the stem portion. The blank 73 is then subjected to a blow by the hammer causing the unreduced portion 79 to be upset to form the round head 86 of the completed blank 74. The outer end of the die recess 85 may be provided with circular shoulder sections or countersinks 87 and 88 which form shoulder sections 89 and 90 on the finished blank.

During this upsetting operation the force or stress of the blow is taken by the tapered shoulder 80 engaging the outer end of the die recess 85 and, in some instances, in part by engagement of the stem portion 78 with the knock-out pin 91. In taking the thrust of the upsetting operation the inner end of the stem portion 78 may be slightly upset against the knock-out pin 91, as indicated by the short section 92, but such upsetting is limited in amount to the diameter of the die recess 85. Also, the tapered section 80 in taking the upsetting thrust is acted upon by the outer end of the die recess and substantially all of the metal of the tapered section is pushed back or displaced axially into the shoulder section 89. This displacement or pushing back of the metal of the tapered section 80 may leave a short section 93 of slightly larger diameter on the stem portion 78. The sections 92 and 93 are not objectionable on the finished blank because their diameters exceed the diameter of the other portions of the stem 72 only by the amount of the tolerance of the die recess 85 which may be only one or two thousandths of an inch.

A feature of my novel method, as explained above, resides in the fact that a portion of the length of stock is reduced to a stem portion of threading diameter by a single extruding operation. This is of importance because when a plurality or succession of extruding operations is employed each additional extrusion requires added handling of the blanks, increases the number of operations to be performed and the number of dies to be provided and maintained. Furthermore, the successive extrusions may result in operation shoulders or other objectionable irregularities in the finished blanks. I attribute the ability of my novel extruding die to so reduce the stock to threading diameter in one operation, to the fact that the die is provided with a relatively long guide section at the outer end of the die recess. In the case of the above described extruding dies 23, 53 and 70 these guide sections are the cylindrical openings 26, 54 and 76. In the extruding dies 23 and 53 the guide sections have a length substantially equal to one-half of the diameter of the stock to be extruded. In the case of the extruding die 70 the guide section 76 has a length equal to substantially one and one-fourth times the diameter of the stock 72. These specific lengths are mentioned here merely as examples, it being understood that the length for the guide section may be varied to suit the size and other characteristics of the stock being worked.

Although I have shown a hammer only in connection with the blank 73 of Figure 14, it will be understood, of course, that a suitable hammer cooperates with each of the extruding and upsetting dies herein illustrated and described.

In the specification and claims I have used the expression "tolerance" in defining the size of the recess of the upsetting die in relation to the size of the recess of the extrusion die, and by this expression I mean a dimensional variaton between the die recesses on the order of hundredths or thousandths of an inch but the exact value of which may be dependent upon various factors such as the diameter and other characteristics of the stock being worked.

From the foregoing description and the accompanying drawing it will now be readily seen that I have provided a novel method and means for the production of headed blanks by which a portion of a length of stock is reduced to threading diameter by a single extruding operation. It will be seen furthermore that my novel method and means provides for the upsetting of the unreduced portion of the stock substantially without change in the diameter of the reduced stem portion of the blank. My novel method and means for forming headed blanks not only make possible the more economical production of such blanks, but provide for the production of blanks which are straighter and in other respects superior in quality to blanks manufactured by processes in use heretofore.

While I have illustrated and described the method and means of my invention in a somewhat detailed manner, it will be understood, of course, that I do not wish to be limited to the precise details and steps of procedure herein disclosed but regard my invention as including such changes and modifications as do not constitute a departure from the spirit of the invention and the scope of the appended claims.

Having thus described my invention I claim:

1. The method of making headed blanks for bolts or the like which comprises reducing a portion of a length of stock by a single extrusion and thereby forming a blank having a stem portion of a diameter substantially equal to the pitch diameter of the thread to be formed thereon, a head portion and a tapered section connecting the stem and head portions, and then upsetting said head portion to form a head and in the same operation forming said tapered section into a shoulder.

2. The method of making headed blanks for bolts or the like which comprises reducing a portion of a length of stock by a single extruding operation and thereby forming a blank having a stem portion of a diameter substantially equal to the pitch diameter of the thread to be formed thereon, a head portion and a tapered section connecting the stem and head portions, and then reducing said tapered section by forcing the same into a die opening and in the same operation upsetting said head portion to form a head.

3. The method of making headed blanks for bolts or the like which comprises reducing a portion of a length of stock by a single extruding operation and thereby forming a blank having a stem portion of a diameter substantially equal to the pitch diameter of the thread to be formed thereon, a head portion and a tapered section connecting the stem and head portions, inserting said stem portion into a die opening of a diameter to just freely receive the stem portion, and then upsetting said head portion by a blow the thrust of which is taken against said tapered section and in the same operation utilizing the thrust of the upsetting blow to form the tapered section into a shoulder.

4. The method of making headed blanks for bolts or the like which comprises reducing a portion of a length of stock by a single extruding operation and thereby forming a blank having a stem portion of a diameter substantially equal to the pitch diameter of the thread to be formed thereon and a tapered section connecting the stem portion with the unreduced portion of the blank, and then inserting said stem portion into a die opening only large enough to freely receive the stem portion and upsetting said unreduced portion and tapered section to form a shouldered head.

ROBERT J. CORDES.